United States Patent [19]

Cohen

[11] Patent Number: 5,009,497
[45] Date of Patent: Apr. 23, 1991

[54] CONTACT LENSES UTILIZING KEEL ORIENTATION

[76] Inventor: Allen L. Cohen, 10010 Walsham Ct., Richmond, Va. 23233

[21] Appl. No.: 185,217

[22] Filed: Apr. 22, 1988

Related U.S. Application Data

[63] Continuation-in-part of Ser. No. 120,263, Nov. 12, 1987, abandoned.

[51] Int. Cl.⁵ .............................................. G02C 7/04
[52] U.S. Cl. ................................. 351/161; 351/160 R; 351/160 H
[58] Field of Search ............... 351/160 R, 160 H, 161, 351/162

[56] References Cited

U.S. PATENT DOCUMENTS

| 4,508,436 | 4/1985 | Sittarle | 351/160 H |
| 4,637,697 | 1/1987 | Freeman | 351/161 |
| 4,640,594 | 2/1987 | Brager | 351/160 R |

FOREIGN PATENT DOCUMENTS 2519708  11/1975  Fed. Rep. of Germany ... 351/160 R

*Primary Examiner*—Bruce Y. Arnold
*Assistant Examiner*—Scott J. Sugarman
*Attorney, Agent, or Firm*—Finnegan, Henderson, Farabow, Garrett & Dunner

[57] ABSTRACT

The invention relates to a variety of contact lens designs which attempt to achieve a stable lens orientation by providing such contact lenses with approximately circular profiled grooves or channels. These profiled tracks act as circular keels inhibiting translation and thereby aiding rotational stabilization of the lens.

5 Claims, 1 Drawing Sheet

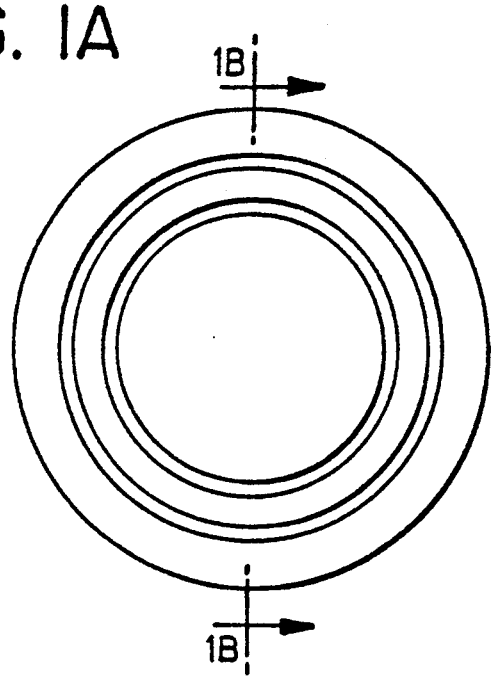
FIG. IA
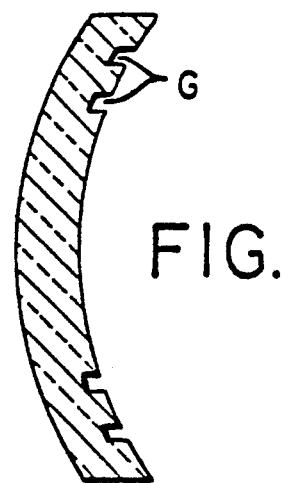
FIG. IB
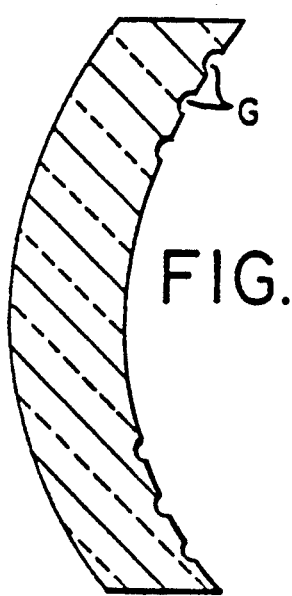
FIG. 2
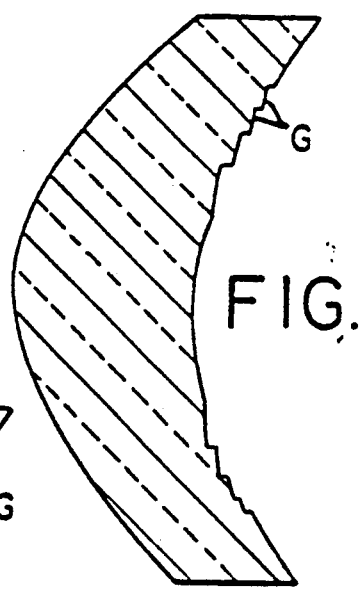
FIG. 4
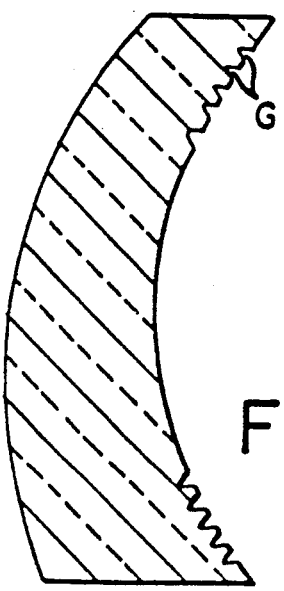
FIG. 3

CONTACT LENSES UTILIZING KEEL ORIENTATION

RELATED APPLICATIONS

This application is a continuation-in-part of copending application Ser. No. 120,263, filed Nov. 12, 1987, now abandoned and it is related to commonly assigned applications, Ser. Nos. 120,265 and 120,262, both filed on Nov. 12, 1987.

BRIEF DESCRIPTION OF THE INVENTION

Ophthalmic contact lens possessing enhanced stability to translational slippage thereby facilitating rotational orientation by providing an arrangement of circular or near-circular profiled grooves cut into the anterior, posterior or both of the lens surfaces.

BACKGROUND TO THE INVENTION

This invention concerns contact lenses of a variety of designs, from the conventional monofocal, and, as well, contact lenses utilizing phase plate optics, such as phase plate bifocals and "tuned" Fresnel lenses arranged as annular and concentric zones. The latter type of lenses generally follow the unique designs described by Allen L. Cohen in U.S. Pat. Nos. 4,210,391; 4,338,005; and 4,340,283. The bifocal lens design of Cohen, supra, provides that the radii "$r_n$" of the annular and concentric zones are substantially proportional to $\sqrt{n}$ (herein called a "Cohen lens design"). Other characterizations of multifocal lenses which would employ a Cohen lens design in operative embodiments are described by Freeman in U.S. Pat. Nos. 4,637,697; 4,641,934; and 4,642,112.

Contact lenses which utilize prism ballast, peri-ballast, truncation or some other stabilizing means, frequently lack stable lens orientation. Heretofore, this has been true in toric lenses, bifocal lenses and other contact lenses that are not rotationally symmetric. It is desirable to stabilize progressive add contact lenses and other aspheric contact lenses which need to remain in a well centered position on the eye.

Translation and orientation of a contact lens was assumed to result from the abutment of a truncated lens edge against the lower lid margin of an eye. However, this has been shown to have only a minimal effect by I. M. Borish and D. Perrigin in their article Observations of Bifocal Contact Lenses, *Inter. Eyecare*, 1 (3), 1985.

Orientation in contact lenses, assumed to result from a weight differential induced by prism and thereby causing a pendulum effect, has only a marginal effect according to A. L. Cohen in his article The Role of Gravity in Prism Ballasting, *Amer. J. Opt. and Phys. Optics*, May 1976.

Heretofore, regardless of the specific mechanism, all contact lenses that are stabilized by virtue of a geometrical asymmetry, incorporate prism into their lens design. Such lenses have wedge-like cross-sections. An underlying mechanism for contact lens orientation upon an eye is related to pressure effects upon wedges. This has been pointed out by A. J. Hanks in his article The Watermelon Seed Principle, *Contact Lens Forum*, September 1983.

When an upper eyelid closes over a contact lens with a wedge-like cross-section, pressure is asymmetrically applied as the lens is sandwiched between the eye and eyelid. This asymmetric squeezing pressure causes movements which preferentially direct the lens base first out from between the lid-eye sandwich. This "base first" orientation is achieved by a combination of translation and rotation.

A significant feature of such lenses as described in their ability to rest upon the eye in a stable orientation. While numerous advances have been made in lens design, these lenses are still far from perfected and often position incorrectly. A large part of their instability upon the eye relates to the excessive translational movements that these lenses undergo when subjected to a blinking eyelid.

It is recognized that there is a need for contact lenses that— center well upon the eye,
ride upon the eye with a stable orientation, and
exhibit very little translational motion upon the eye.

This invention has the objective of accomplishing these needs by a new mechanism, other than by the base curve, diameter, and the like features of lenses, to aid in the fitting and stabilization of a contact lens.

THE INVENTION

The invention is directed to an ophthalmic contact lens with an arrangement of one or more circular or near-circular profiled grooves cut into the anterior or posterior or both the anterior and posterior lens surfaces. The invention embraces ophthalmic contact lens of (i) soft toric contact lens design such as those which are prism ballasted and (ii) aspheric rigid or soft contact lens.

BRIEF DESCRIPTION OF THE DRAWINGS

FIGS. 1A and B show front and cross-sectional side views of a contact lens with two circular grooves, of square cross-sectional profile cut into the peripheral back surface of the lens.

FIG. 2 shows a cross-sectional side view of a contact lens with three circular grooves with semicircular cross-sectional profiles cut into the peripheral back surface of the lens.

FIG. 3 shows a cross-sectional side view of a prism ballasted toric contact lens with five circular grooves cut into the peripheral back surface of the lens, each groove having a triangular cross-sectional profile.

FIG. 4 shows a cross-sectional side view of an aspheric contact lens with four circular grooves cut into the intermediate portion of the back surface of the lens. The separated grooves have wedge-shaped profiles of decreasing cross-sectional widths.

DETAILS OF THE INVENTION

This invention concerns contact lenses and, more particularly, contact lenses with optical powers and configurations that are not rotationally symmetric, such as translating rigid bifocal contact lenses, astigmatism correcting soft contact lenses, and the like.

When a contact lens is asymmetrically squeezed 'base first' out from under an overriding upper eyelid, there is some translation or downward slippage as well as rotational orientation. This downward slippage relieves some of the eyelid pressure, thereby reducing the effective stabilizing forces acting on the lens.

The present invention utilizes an arrangement of circular, or near circular, profiled grooves cut into a contact lens surface. These grooves act as keels or rails and guide the motion of a contact lens as it moves under the applied pressure of the upper eyelid. In particular, since the channels are cut in a circular or circular-like fashion, they will tend to inhibit any translational slippage thereby facilitating rotational orientation.

The grooves act like an angle bracket in stabilizing the lens from puckering motion brought on by the movement of the eyelid. In this respect, the shape and form of the groove should not be deficient in providing such support. For example, a groove that is too wide or too narrow may not provide the required dimensional stability unless the wall orientation is properly configured, such as with a slight reentry angle. Grooves that have much wider openings than the nadir portion of the groove tend not to provide the level of support for effective stabilization of the lens.

Because translational slippage is reduced, contact lenses with circular profiled grooves cut into their surfaces will tend to be less mobile upon the eye. As a consequence, such circular grooves aid in the fit of contact lenses that need to remain centered upon the eye. This is especially the case with aspheric contact lenses which are more inclined to remain centered upon the eye when they are configured with circular profiled grooves in accordance with the invention.

If the channels are cut into the central optic zone of the lens, they may be profiled so as to contribute to the lens power in the manner of a Fresnel lens or by the mechanism of diffraction.

However, in the preferred embodiment of the invention, the channels are cut into the periphery of the contact lens thereby avoiding any unwanted optical effects. There may be one or more approximately circular channels. The individual channels may have similar cross-sectional profiles or they may have differing profiles. Finally, the channels may be spaced uniformly apart, but need not be spaced uniformly apart.

While the channels should ideally have a cross-sectional width in the range 5-5000 microns and a depth in the range 0.1-10 microns, they need not be restricted to this range. They must, however, be of a circular, elliptical, spiral or other near circular design.

The invention may be applied to any known type of contact lens provided that the circular channels are designed so as not to interfere with the physiological health of the eye. For example, grooves may be placed upon the back or ocular surface of a rigid contact lens within an area of the lens that is vaulted above the cornea. Or, for example, the grooves may be very shallow (i.e. less than 10 microns in depth) so as to be suitable for use upon the back surface of a soft contact lens.

Of course, the stabilizing channels may be configured upon the front surface of a contact lens, in addition to or instead of, the back surface.

FIGS. 1A and B characterize the front and side view positioning of grooves in an ordinary contact lens. The embodiment of the invention shown in FIG. 2 illustrates an ordinary contact lens CL provided with three near-circular grooves G formed in the periphery of the back surface of the contact lens. In this example, each groove has a semicircular profile.

The embodiment of the invention shown in FIG. 3 illustrates a prism ballasted toric contact lens CL with five near-circular grooves G formed in the periphery of the back surface of the contact lens. In this example, each groove has a triangular profile.

The embodiment of the invention shown in FIG. 4 depicts an aspheric contact lens CL with four near-circular grooves G formed in the intermediate region of the back surface of the contact lens. In this example, the separate grooves have wedge-shaped profiles of decreasing cross-sectional widths.

The lens of the invention may be made conventional processes in the art. For example, anhydrous versions of the base phase of a soft contact lens may be ground to provide the lens structures of the invention. Lenses may be casted from molds replicating the lens structures of the invention. The lenses may be made of glass and the conventional plastics used for making contact lenses.

I claim:

1. An ophthalmic contact lens of (i) soft toric contact lens design such as those which are prism ballasted and (ii) aspheric rigid or soft contact lens possessing enhanced stability to translational slippage thereby facilitating rotational orientation comprising an arrangement of one or more circular or near-circular profiled grooves cut into the anterior, posterior or both lens surfaces.

2. The opthalmic contact lens of claim 1 comprising a soft toric contact lens.

3. The opthalmic contact lens of claim 2 comprising a soft toric contact lens which is prism ballasted.

4. The opthalmic contact lens of claim 1 comprising an aspheric rigid or soft contact lens.

5. The opthalmic contact lens of claim 1 comprise one or more channels having a cross-sectional width in the range of about 5-5000 microns and a depth in the range about 0.1-10 microns.

* * * * *